United States Patent [19]

Tuten et al.

[11] 4,022,018

[45] May 10, 1977

[54] MOUNTING SYSTEM FOR A THRUST GENERATING ENGINE

[75] Inventors: Richard K. Tuten; Richard J. Barron; Lawrence B. Venable, all of Cincinnati, Ohio

[73] Assignee: General Electric Company, Cincinnati, Ohio

[22] Filed: Apr. 29, 1975

[21] Appl. No.: 572,647

[52] U.S. Cl. .......................... 60/200 R; 60/39.31; 244/54; 248/5; 248/16
[51] Int. Cl.² .................... F02C 7/20; B64D 27/16
[58] Field of Search ............ 60/39.31, 200 R; 244/54; 248/5, 16, 17, 54 CS, DIG. 1

[56] References Cited
UNITED STATES PATENTS

| | | | |
|---|---|---|---|
| 2,344,735 | 3/1944 | Rockwell | 248/5 |
| 2,965,338 | 12/1960 | McLean | 248/5 |
| 3,327,965 | 6/1967 | Bockrath | 244/54 |
| 3,837,602 | 9/1974 | Mullins | 244/54 |
| 3,907,220 | 9/1975 | Amello | 244/54 |

Primary Examiner—Carlton R. Croyle
Assistant Examiner—Robert E. Garrett
Attorney, Agent, or Firm—Henry J. Policinski; Derek P. Lawrence

[57] ABSTRACT

An improvement in a mounting system for mounting a thrust generating engine to an aircraft wherein force generating means are operatively connected to a casing surrounding and supporting the engine for applying a variable force to the casing for maintaining the engine in a predetermined position relative to said aircraft.

14 Claims, 4 Drawing Figures

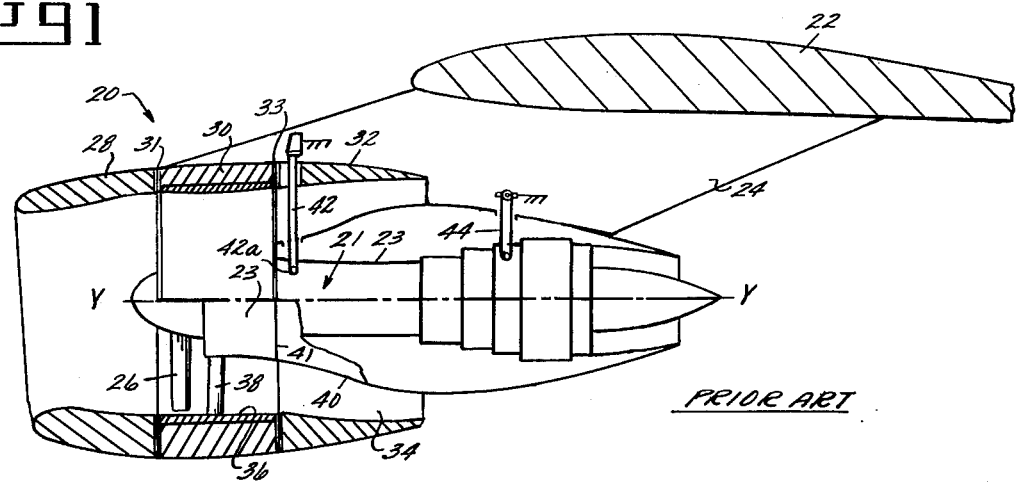
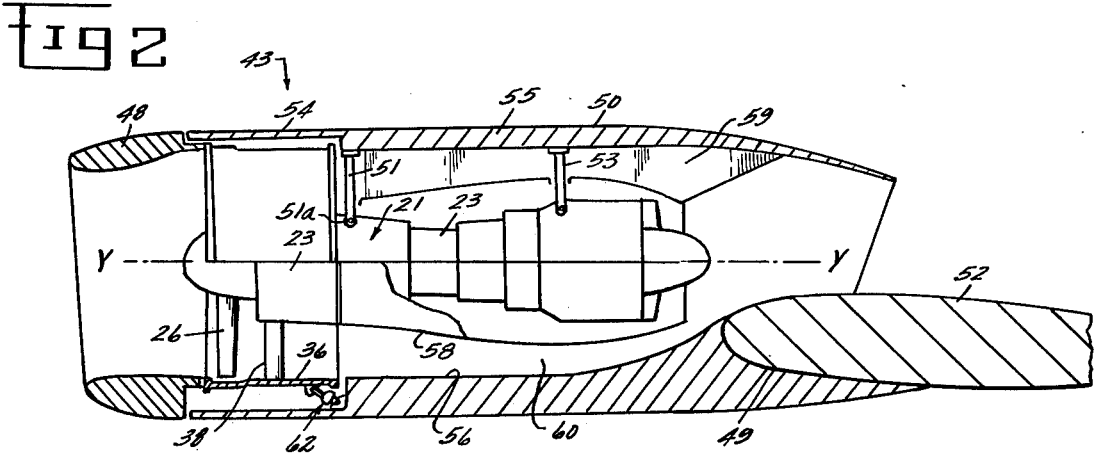
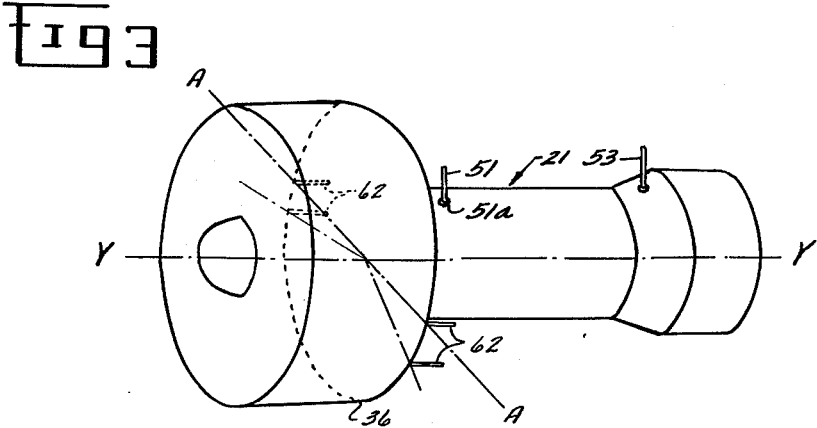

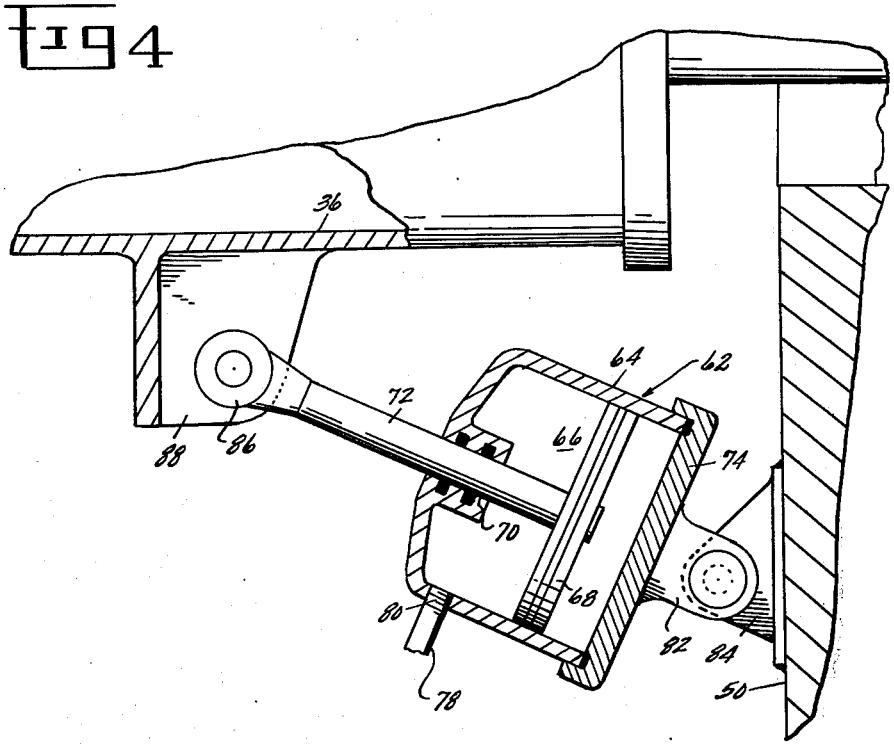

MOUNTING SYSTEM FOR A THRUST GENERATING ENGINE

BACKGROUND OF THE INVENTION

This invention relates to an improvement in a system for mounting an engine to the structure of an aircraft.

The invention herein described was made in the course of or under a contract, or a subcontract thereunder, with the United States Department of the Air Force.

In the aircraft industry, it is generally desirable that aircraft engines by readily adaptable to a variety of aircraft without substantial modification or redesign. In many instances, mounting of an aircraft engine, designed for one type of aircraft, to another aircraft of a different type can result in additional stress and deflection in the structural components of the engine. Additional stress and deflection are typically encountered where an engine originally designed to carry its own exhaust nozzle is mounted to an aircraft having the exhaust nozzle as an integral part of the aircraft structure.

Aircraft engines carrying the exhaust nozzle generally are subject to lower net reactive thrust forces than aircraft engines used with an exhaust nozzle integrally attached to the aircraft. In the former instance, lower net reactive thrust forces result from the transfer of additional nozzle loads, which oppose the reactive thrust forces, directly to the engine. In the latter instance the nozzle loads are transferred to the aircraft and hence the net reactive thrust forces on the engine are of higher magnitude by an amount equal to the nozzle load.

In aircraft mounted nozzle systems the higher magnitude reactive thrust forces on the engine are reacted by the engine main thrust mount which is usually offset from the center of thrust of the engine thereby resulting in the imposition of additional bending moments and associated bending stresses and deflections on the engine. These additional bending stresses and deflections are usually not present in engines carrying the exhaust nozzle since in that instance the nozzle loads are transferred to the engine uniformly around the circumference of the engine thereby reducing the net reactive thrust load on the engine.

The aforementioned additional bending stresses and deflections in appropriate circumstances can cause rubbing between rotating portions of the engine compressor and turbine and their respective stationary elements at high power settings. This results in excessive operating clearances at lower power settings and an associated decrease in engine efficiency.

The deleterious effects of the additional bending stresses and deflections described above can, of course, be reduced by increasing the thickness of the load bearing elements of the engine or by fabricating the elements from stronger materials. However, these approaches are not compatible with overall objectives of having an engine which is readily adaptable with minimum design modification and with a combination of minimum weight and minimum cost.

While the use of auxiliary multiple rigid mounts may also eliminate the aforementioned deflections, such an approach does not allow for thermal growth of the engine under operating conditions and requires close tolerance control of the interface between the engine and the mount. Furthermore, it is desirable to eliminate only those bending stresses and deflections associated with the increase in the reactive thrust load as described above. Generally, aircraft engines are mounted in a manner permitting a limited amount of relative movement between the engine or parts thereof and surrounding aircraft structure when the engine is generating thrust. In order to accommodate the relative movement, the engine itself is designed to flex in a specific fashion and undergo acceptable limited stress and deflection. The use of auxiliary fixed rigid mounts which eliminate not only the aforementioned additional stress and deflection but also preclude the relative movement between the engine and the aircraft, alters the normal compatibility between the engine and the aircraft, constrains the engine from flexing and induces internal loads on the engine inconsistent with its original design. Accordingly, auxiliary fixed mounts do not provide an acceptable solution to the aforementioned problems.

BRIEF SUMMARY OF THE INVENTION

Therefore, it is an object of the present invention to provide an improvement in a system for mounting an aircraft engine to an aircraft in a reliable and efficient manner.

It is another object of the present invention to provide, for an aircraft engine, an improvement in the mounting system which permits fastening of the engine to a variety of aircraft in a manner to eliminate additional bending stresses and deflections in the structural elements of the aircraft engine.

It is still another object of the present invention to provide an improvement in such a mounting system which permits the fastening of the engine to a variety of aircraft without extensive modification or redesign of the engine and in an inexpensive manner.

These and other objects, which will become apparent hereinafter from the description of the preferred embodiment, are accomplished by the present invention which provides an improvement in a system for mounting a thrust generating engine to an aircraft wherein the engine includes a casing for enclosing and supporting at least some of the thrust generating elements of the engine and the mounting system includes means for connecting the casing to the aircraft for retaining the engine against rotational, vertical, axial and side movement relative to the aircraft. The improvement comprises force generating means connected to the engine casing for applying a variable force to the engine casing for maintaining the engine in a predetermined position relative to the aircraft. Such force is varied in accordance with variations in thrust generated by the engine. One embodiment of the inventon includes means to provide to the force generating means a signal proportional to engine thrust. The force is varied by the force generating means in response to variations of the signal. The force generating means may be comprised of fluid pressure responsive means and the signal may be comprised of engine compressor discharge pressure. More specifically, the fluid pressure responsive means may be comprised of a piston, a piston rod secured to the piston and a housing having a chamber adapted to receive said piston. The housing has an aperture to receive the piston rod which extends through the aperture and is connected to either of the engine casing on the aircraft. The housing is connected to the other of the engine casing or the aircraft. The fluid pressure responsive means also includes means for admitting compressor discharge pressure into the chamber.

BRIEF DESCRIPTION OF THE DRAWINGS

FIG. 1 depicts an engine mounted to an aircraft in accordance with common prior art practice;

FIG. 2 depicts an engine mounted in accordance with the improvement of the present invention;

FIG. 3 is a schematic depicting the improved mounting system comprising one preferred form of the present invention; and FIG. 4 is an enlarged cross-sectional view of a portion of the mounting system shown in FIG. 2.

DESCRIPTION OF THE PREFERRED EMBODIMENT

With reference now to FIG. 1, a turbofan aircraft engine shown generally at 20 is secured to an aircraft wing 22 by a pylon 24. The turbofan engine 20 is comprised of a core engine 21 of a generally well-known type which includes (not shown), in serial flow relationship a compressor, a combustor, first turbine means driving the compressor, second turbine means connected to a fan 26 disposed at the upstream end of the engine ahead of the compressor, an engine casing 23 enclosing and supporting these aforementioned engine components and a fan casing 36 surrounding fan 26. While engine casing 23 may consist of a number of consecutive segments, for purposes of this description casing 23 can be considered of one-piece construction. Engine 20 is further comprised of an inlet cowl 28, a fan cowl 30 and a fan nozzle 32, each axially and circumferentially extending to surround core engine 21 and define the radially outward boundary of a generally annular flow path 34 through which pressurized air is ejected to provide propelling thrust for the aircraft. Fan cowl 30 is attached to and carried by fan casing 36 along circumferential joints 31 and 33. Struts 38 are rigidly affixed for securing fan casing 36 to core engine 21. Inlet cowl 28 and nozzle 32 are also carried and supported by fan casing 36 along circumferentially extending joints 31 and 33, respectively.

Core engine 21 is enclosed by axially and circumferentially extending fairing 40 which defines a streamlined aerodynamic contour around core engine 21. Fairing 40 surrounds engine casing 23 and is attached to core engine 21 at joint 41 by means not shown and, as observed in FIG. 1, defines the radially inward boundary of annular flow path 34.

Engine 20 is mounted to pylon 24 in the conventional manner wherein engine casing 23 is rigidly secured to a forward thrust mount post 42 and to rear mount post 44, both extending from pylon 24. Conventionally, post 42 is designed to absorb the vertical side and axial loads on engine 20 at its connection therewith at 42a while post 44 is designed to absorb vertical, side and rotational loads. Posts 42 and 44 each mount to engine casing 23 at points offset from the axial centerline Y—Y of engine 20.

Under operational conditions fan 26 of engine 20 propels pressurized air in the rearward direction. As pressurized air is thrust in the rearward direction an equal and opposite thrust reaction force is exerted in the forward direction on fan 26 and hence on core engine 21 in proportion to the mass and velocity of the pressurized air. The thrust reaction force is absorbed at the connection 42a between thrust post 42 and engine casing 23.

As pressurized air flows through annular flow path 34 it imposes a force in the rearward direction on nozzle 34 and fairing 40 due to nozzle effects of flow path 34 and, to a lesser degree, the viscosity induced drag associated with the flowing pressurized air. Since nozzle 34 and fairing 40 are each secured to and surround the core engine 21 this force is transferred to core engine 21 at points surrounding and equally spaced from the axial centerline of engine 20. The resultant force is hence co-axial with the centerline of engine 20. As is readily observed the rearwardly acting force imposed by the pressurized air is in a direction opposite to the forward acting thrust reaction force on the engine 20. Hence, the net thrust reaction force absorbed at the thrust mount connection 42a is of a reduced magnitude.

Referring now to FIG. 2, a core engine is depicted identical to that depicted in FIG. 1. However, since the elements surrounding the core engine are attached to the aircraft in a manner hereinafter to be described the core engine is subject to a reactive thrust load differing from the load imposed in FIG. 1. For sake of simplicity, numbers referring to the core engine shown in FIG. 2 will be the same as those used in FIG. 1.

A turbofan engine shown generally at 43 is comprised of a core engine 21, an inlet cowl 48 and an axially and circumferentially extending nacelle 50 surrounding and enclosing core engine 21. As previously described for the conventional system in FIG. 1, core engine 21 includes engine casing 23 and fan casing 26. Nacelle 50 is mounted directly to the aircraft at 49 and, in the present instance, is shown as an integral part of the aircraft wing 52. Inlet cowl 48 is rigidly secured to fan case 36. Core engine 21 is connected to nacelle 50 by forward thrust mount post 51 and rear mount post 53 in the same manner as described for posts 42 and 44 in FIG. 1, respectively.

Nacelle 50 is comprised of a forward portion 54 which surrounds fan casing 36 and an aft portion 55 which surrounds the remaining portion of engine core 21 and corresponds to nozzle 32 of FIG. 1. Aft portion 55 includes circumferentially and axially extending surface 56 surrounding core engine 21 and circumferentially and axially extending fairing 58 also surrounding the core engine 21 and radially spaced from surface 56 to define a generally annular flow path 60 through which pressurized air is ejected to provide propelling thrust to the aircraft. Fairing 58 is carried by aft portion 55 through a plurality of radially and axially extending and circumferentially spaced webs 59.

As pressurized air flows through annular flow path 60, it imposes a force on nacelle 50 in the rearward direction due to the nozzle effects of flow path 60 and to a lesser degree, the viscosity induced drag associated with the flowing pressurized air. However, in the embodiment shown in FIG. 2, the rearwardly acting force is transferred to the wing 52 of the aircraft rather than to the core engine 21 as was the case with the scheme depicted in FIG. 1. Hence, in the former instance the force does not subtract from the thrust reaction force exerted on core engine 21 and, as a result, a higher force is absorbed at the thrust mount post 51.

Since the thrust reaction force is absorbed at the connection 51a between engine casing 23 and thrust mount post 51 which is removed from the axial centerline of engine 42, the increased thrust reaction load creates an increased bending moment which induces additional undesirable bending stress and bending deflections in engine case 23. While a bending moment is present in the conventional mounting scheme depicted in FIG. 1, the larger thrust reaction force exerted at the connection 51a in the FIG. 2 results in excessive bending moments.

The present invention is directed at an improvement in the mounting system which will reduce the aforementioned excessive bending moment to an acceptable level. The present invention provides a plurality of force generating struts 62 connected between core engine 21 and nacelle 50 for inducing rearward loads on the core engine 21 equivalent to the forces exerted by the nozzle 32 present in the FIG. 1 prior art device. While the force generating struts 62 are shown with one end connected to the nacelle structure 50, that connection may be made with other parts of the aircraft or even with strong rigid portions of the core engine 21 itself. While only one force generating strut 62 is depicted in FIG. 2, and while in many instances only one strut 62 will be sufficient to accomplish the objects of this invention, it is within the scope of the present invention to provide a plurality of struts 62 circumferentially spaced around the core engine 21. It has been found most advantageous to utilize four struts 62, two of which are located on the horizontal centerline A—A of the engine at the 3 and 9 o'clock positions and two of which are located 30° below the horizontal centerline A—A at the 4 and 8 o'clock positions as shown in FIG. 3.

FIG. 4 depicts an enlarged view of the force generating strut 62 shown in FIG. 2. In this embodiment, strut 62 is a fluid pressure responsive device comprised of a housing 64 having a chamber 66 adapted to receive a piston 68 therein and a centrally located aperture 70 adapted to receive a piston rod 72 which is secured to piston 68. Housing 64 has an end cap 74 which is secured to housing 64 by conventional means. Conduit 78 communicates with chamber 66 through aperture 80 in housing 64 and provides a fluid pressure signal to chamber 66 for controlling the level of force generated by strut 62. The other end of conduit 78 is connected with a source of pressure for purposes hereinafter to be described.

End cap 74 has a protruding mounting boss 82 which is adapted to be received by and secured to a mounting flange 84 fixedly attached to nacelle 50. Piston rod 72 is provided with a mounting boss 86 which is adapted to be received by and secured to a mounting flange 88 fixedly attached to fan casing 36. In this manner force generating strut 62 is secured between nacelle 50 and fan casing 36 and, as will now be described, provides a variable force for biasing the core engine 21 in the rearward direction thereby reducing the bending moments to an acceptable level.

Chamber 66 of strut 62 is in communication via conduit 78 with a source of fluid pressure (not shown) which provides a pressure signal for controlling and determining the magnitude of force generated by the strut 62. More specifically, conduit 78 is in communication with the outlet of the compressor of the core engine 21 and delivers pressurized air at the compressor discharge pressure to chamber 66.

Pressurized air acts upon the left face (as viewed in FIG. 3) of piston 68 to generate a force acting in the aft direction which is applied to fan casing 36 of core engine 21 and hence to core engine 21 by piston rod 72. The force applied by piston 68 on fan casing 36 is in a direction opposite to the forwardly acting thrust reaction force on core engine 21 and hence reduces the net thrust reaction load absorbed at the connection 51a of thrust mount post 51 and engine casing 23. Furthermore, the force generated by struts 62 holds fan casing 36 and, hence core engine 21, in a predetermined position wherein only normal and acceptable bending stresses and deflections are imposed on the engine. The aforementioned predetermined position will, of course, vary with the magnitude of the force generated by struts 62.

The aforementioned reduction in net thrust reaction load and retainment of the core engine in the predetermined position both serve to preclude the inducement of additional undesirable bending moments and associated bending stress and deflection in core engine 21. Hence interference between the rotating parts of the engine compressor and turbine and their respective stationary elements is avoided.

The struts 62 can be designed such that when acting in concert they provide essentially the same loading on core engine 21 as is provided by attaching the nozzle 32 to engine 21. The present invention, while serving to eliminate additional bending moments, still permits flexing of the engine and normal relative movement of the engine with respect to the aircraft under thrust generating operation since the struts 62 are not fixed rigid mounts. Furthermore, since the force generated by struts 62 is independent of the relative position of piston 68 with respect to housing 64, the force generated will be independent of movement between fan case 32 and nacelle 50. Hence, strut 62 permits normal and acceptable movement between the engine and the nacelle and acceptable flexing of the engine, while at the same time eliminating the excessive stresses and deflections which would otherwise cause the adverse conditions described previously.

The magnitude of the pressure generated by the compressor of core engine 21 is proportional to the level of thrust generated by core engine 21. Hence since the force generated by struts 62 is dependent on compressor pressure it is variable in accordance with and proportional to generated thrust. Consequently, as engine thrust increases and the thrust reactive force on core engine increases, the force generated by struts 62 increases to offset the increase in thrust reactive force. The net reactive thrust load absorbed by the thrust mount post 51 is thereby maintained at acceptable levels at all power settings of the core engine 21 and excessive increased bending moments and associated bending stresses and deflections are eliminated.

While the description of the preferred embodiment discloses the use of compressor discharge pressure to control and establish the magnitude of the force generated by struts 62, other alternative signals and force generators may also be used in connection with the present invention. By way of example, struts analogous to struts 62 may be utilized to generate a force by electrical, mechanical or other pressure responsive means and the signal may appropriately be electrical or mechanical. Where the struts are fluid pressure responsive, other pressure signals, such as fuel pressure or pressure bled from other stages of the core engine 21, may be used.

What is desired to be secured by Letters Patent of the United States is:

1. In a system for mounting a thrust generating engine to an aircraft wherein the engine includes a casing for enclosing and supporting at least some of the thrust generating elements of the engine and said mounting system includes means connecting the casing to the aircraft for retaining said engine against rotational, axial, vertical and side movement relative to said aircraft, the improvement comprising:

force generating means operatively connected to said casing for generating a variable force for application to said casing for maintaining said engine in a predetermined position relative to said aircraft said force generating means generating said force in accordance with a signal which is dependent on a force other than the thrust reaction force exerted on said force generating means by said thrust generating engine, said signal being indicative of the level of thrust of said thrust generating engine.

2. The invention as set forth in claim 1 wherein the variable force applied by said force generating means is variable in accordance with variations in thrust generated by the engine.

3. The invention as set forth in claim 1 wherein said signal is proportional to the level of thrust generated by said engine, said force generating means receiving said signal and varying said variable force in response to variations in said signal.

4. The invention as set forth in claim 1 wherein said variable force is of a first predetermined magnitude when the generated engine thrust is at a first level and said variable force is of a second predetermined magnitude when the generated engine thrust is at a second level.

5. The invention of claim 1 wherein the force generating means includes fluid pressure responsive means.

6. The invention as set forth in claim 5 wherein said pressure responsive means is responsive to a fluid pressure indicative of the magnitude of thrust generated by said engine.

7. The invention as set forth in claim 6 wherein said fluid pressure is engine compressor discharge pressure.

8. The invention as set forth in claim 7 wherein said pressure responsive means is comprised of
 a piston,
 a piston rod secured to said piston,
 a housing a chamber adapted to receive said piston, said piston rod extending from said housing and secured to one of said engine casing or said aircraft, said housing being secured to the other of engine casing or said aircraft and
 means for admitting said compressor discharge pressure into said chamber.

9. In a system for mounting a thrust generating engine to an aircraft wherein the engine includes a casing for enclosing and supporting at least some of the thrust generating elements of the engine and mounting means connecting the casing to the aircraft for retaining said engine against rotational, vertical, axial and side movement relative to said aircraft, the improvement comprising:
 a signal indicative of the level of thrust of said thrust generating engine; and
 force generating means receiving said signal and operatively connected to said casing for generating a variable force for application to said casing, said signal being dependent on a force other than the thrust reaction force exerted on said force generating means by said thrust generating engine, said variable force being variable in accordance with a said signal.

10. The invention as set forth in claim 9 wherein said force generating means includes fluid pressure responsive means responsive to said signal and said signal comprises a pressure indicative of the level of thrust generated by said engine.

11. In a system for mounting a thrust generating engine to an aircraft wherein the engine includes a casing for enclosing and supporting at least some of the thrust generating elements of the engine and mounting means connecting the casing to the aircraft for retaining said engine against rotational, vertical, axial and side movement relative said aircraft, the improvement comprising:

force generating means operatively connected to said casing for generating a variable force for application to said casing to limit deflection of said engine said force generating means generating said force in accordance with a signal which is dependent on a force other than the thrust reaction force exerted on said force generating means by said thrust generating engine, said signal being indicative of the level of thrust of said thrust generating engine.

12. In a system for mounting a thrust generating engine to an aircraft wherein the engine includes a casing for enclosing and supporting at least some of the thrust generating elements of the engine and mounting means connecting the casing to the aircraft for retaining said engine against rotational, vertical, axial and side movement relative said aircraft, the improvement comprising:

force generating means operatively connected to said casing for generating a variable force for application to said casing to limit stressing of said engine said force generating means generating said force in accordance with a signal which is dependent on a force other than the thrust reaction force exerted on said force generating means by said thrust generating engine said signal being indicative of the level of thrust of said thrust generating engine.

13. The invention as set forth in claim 6 wherein said fluid is engine compressor pressure.

14. In a system for mounting a thrust generating engine to an aircraft wherein the engine includes a casing for enclosing and supporting at least some of the thrust generating elements of the engine and said mounting system includes means connecting the casing to the aircraft for retaining said engine against rotational, axial, vertical and side movement relative to said aircraft, the improvement comprising:

extendible strut means operatively connected to said casing for applying a variable force to said casing, said strut means applying said variable force in accordance with variations in thrust generated by said engine, said strut means being extendible to a plurality of extended lengths at a first level of engine thrust, said strut means applying the same magnitude of force to said casing for at least two of said extended lengths for said first level of engine thrust.

* * * * *

UNITED STATES PATENT AND TRADEMARK OFFICE
CERTIFICATE OF CORRECTION

PATENT NO. : 4,022,018
DATED : May 10, 1977
INVENTOR(S) : Richard K. Tuten et al It is certified that error appears in the above-identified patent and that said Letters Patent are hereby corrected as shown below:

Column 7, line 41, after "housing" insert --having--.

Signed and Sealed this twenty-third Day of August 1977

[SEAL]

Attest:

RUTH C. MASON
*Attesting Officer*

C. MARSHALL DANN
*Commissioner of Patents and Trademarks*